United States Patent
Sorensen et al.

(10) Patent No.: US 10,663,371 B2
(45) Date of Patent: May 26, 2020

(54) PRESSURE TESTING SYSTEMS WITH SAFETY INTERLOCK

(71) Applicant: Climax Portable Machine Tools, Inc., Newberg, OR (US)

(72) Inventors: David Loyd Sorensen, Taylorsville, UT (US); David Michael Briggs, Carlton, OR (US); Brady Lynn Byers, Newberg, OR (US); Daniel Morgan Jensen, Hillsboro, OR (US)

(73) Assignee: Climax Portable Machine Tools, Inc., Newberg, OR (US)

( * ) Notice: Subject to any disclaimer, the term of this patent is extended or adjusted under 35 U.S.C. 154(b) by 251 days.

(21) Appl. No.: 15/850,727

(22) Filed: Dec. 21, 2017

(65) Prior Publication Data

US 2018/0202891 A1 Jul. 19, 2018

Related U.S. Application Data

(60) Provisional application No. 62/446,245, filed on Jan. 13, 2017.

(51) Int. Cl.
*G01M 3/28* (2006.01)
*F16K 37/00* (2006.01)
(Continued)

(52) U.S. Cl.
CPC .......... *G01M 3/2876* (2013.01); *F16K 35/14* (2013.01); *F16K 37/0083* (2013.01); *F16K 37/0091* (2013.01); *F16L 55/1155* (2013.01)

(58) Field of Classification Search
None
See application file for complete search history.

(56) References Cited

U.S. PATENT DOCUMENTS 2,437,674 A * 3/1948 Armbruster ........ B60K 15/0409
70/173
4,429,711 A * 2/1984 Schomer ................. F16K 35/14
137/385

(Continued)

OTHER PUBLICATIONS

Model 1400 (1400-14-API-165T) Hydrostatic test console and clamp fixture Operating Manual, Climax Portable Machining & Welding Systems, P/N 86716, Mar. 2016.

*Primary Examiner* — Paul M. West
*Assistant Examiner* — Mark A Shabman
(74) *Attorney, Agent, or Firm* — Dascenzo Intellectual Property Law, P.C.

(57) ABSTRACT

Pressure testing systems comprise a clamp assembly for clamping a device for testing with a test fluid, and a control assembly for controlling application of a clamp pressure to the device. The control assembly comprises a clamp control structure with an activated configuration and an inactivated configuration. In the activated configuration, the clamp control structure permits the clamp pressure to be applied to the device. In the inactivated configuration, the clamp control structure permits the clamp pressure to be released from the device. The control assembly also comprises a safety structure that is actuated by the test fluid between an interlocked configuration and a disengaged configuration. In the interlocked configuration, the safety structure physically prevents the clamp control structure from reconfiguring from the activated configuration to the inactivated configuration. In the disengaged configuration, the safety structure permits the clamp control structure to be reconfigured from the activated configuration to the inactivated configuration.

17 Claims, 5 Drawing Sheets

(51) Int. Cl.
*F16K 35/14* (2006.01)
*F16L 55/115* (2006.01)

(56) References Cited

U.S. PATENT DOCUMENTS

| | | | | |
|---|---|---|---|---|
| 4,515,287 | A | * | 5/1985 | Baudoux ................ F16K 27/08 |
| | | | | 220/316 |
| 4,813,456 | A | | 3/1989 | Emmitte, Jr. |
| 4,893,494 | A | | 1/1990 | Hart |
| 5,528,926 | A | * | 6/1996 | Emmitte, Jr. ......... G01M 3/022 |
| | | | | 73/46 |
| 5,576,479 | A | | 11/1996 | Emmitte, Jr. |
| 5,775,880 | A | * | 7/1998 | Vensland ............ B08B 9/0495 |
| | | | | 417/298 |
| 5,880,358 | A | | 3/1999 | Emmitte, Jr. |
| 6,038,918 | A | * | 3/2000 | Newton ............. G01M 13/025 |
| | | | | 73/115.02 |
| 7,210,338 | B2 | * | 5/2007 | Baird ................... F15B 19/005 |
| | | | | 73/115.02 |
| 7,401,494 | B2 | * | 7/2008 | Kim ................... F16K 37/0091 |
| | | | | 73/1.72 |

* cited by examiner

PRESSURE TESTING SYSTEMS WITH SAFETY INTERLOCK

RELATED APPLICATION

This application claims priority to U.S. Provisional Patent Application No. 62/446,245, entitled "VALVE TESTING SYSTEMS WITH SAFETY INTERLOCK" and filed on Jan. 13, 2017, the disclosure of which is incorporated herein by reference.

FIELD

The present disclosure relates to pressure testing systems.

BACKGROUND

Pressure testing systems are used to test the integrity of devices, such as valves, prior to placing devices in service. In many industries, such as the oil and gas industry, certain devices must operate under very high pressures. Accordingly, corresponding pressure testing systems must test such devices under very high pressures. Historically, pressure testing systems have included safety features to restrict a device-under-test from becoming unclamped while pressurized, such as due to operator error. Such safety features historically were accomplished with pneumatic and/or hydraulic logic circuitry. FIG. 1 schematically illustrates such a prior art pressure testing system. In the illustrated prior art example, a device-under-test 10 (e.g., a valve) is clamped between two seal plates 12. Test pressure 14 is applied to the device-under-test 10 through one or both of the seal plates 12. The test pressure 14 is sensed by a pilot op switch 16, but because test pressures are typically too high for the pilot op switch 16, the pressure is reduced to signal level by a regulator 18 before it reaches the pilot op switch 16. The pilot op switch 16 is normally in a position that allows control air pressure 20 (e.g., shop air) to reach a pilot op valve 22, but when the device-under-test 10 is pressurized, the pilot op switch 16 moves to a position which blocks the control air pressure 20 from reaching the pilot op valve 22, and the pilot op switch 16 simultaneously vents downstream control air pressure from the pilot op valve 22. This moves the pilot op valve 22 to the closed position. Hydraulic clamping pressure 24 is applied past a check valve 26 to operate a hydraulic clamping cylinder 28 and can only be released through a manually operated clamp release valve 30 and the pilot op valve 22. When the pilot op valve 22 is in the closed position, hydraulic pressure cannot be released, even if the clamp release valve 30 is opened by the machine operator. In order to release the hydraulic clamping pressure 24, the test pressure 14 must be reduced to the switch threshold of the pilot op switch 16, and then the clamp release valve 30 will be effective.

SUMMARY

Pressure testing systems and methods of pressure testing a device are disclosed.

Pressure testing systems according to the present disclosure comprise a clamp assembly and a control assembly. The clamp assembly is configured to receive, clamp, and operatively seal a device for delivery of a test fluid at a test pressure to the device to test the device for integrity. The clamp assembly is configured to securely clamp the device via application of a clamp pressure of a clamp fluid. The control assembly is operatively coupled to the clamp assembly and is configured to control application of the clamp pressure to the clamp assembly. The control assembly comprises a clamp control structure and a safety structure. The clamp control structure is configured to be manually moved by a user between an activated configuration and an inactivated configuration. In the activated configuration, the clamp control structure permits the clamp pressure of the clamp fluid to be applied to the clamp assembly to securely clamp the device, and in the inactivated configuration, the clamp control structure permits the clamp pressure of the clamp fluid to be released from the clamp assembly to release the device from the clamp assembly. The safety structure is configured to be fluidly actuated by the test fluid between an interlocked configuration and a disengaged configuration. In the interlocked configuration, the safety structure physically prevents the clamp control structure from being moved by the user from the activated configuration to the inactivated configuration, and in the disengaged configuration, the safety structure permits the clamp control structure to be moved by the user from the activated configuration to the inactivated configuration. The safety structure is spring-biased toward the disengaged configuration when the test fluid is below a threshold pressure that is less than the test pressure, and the safety structure is pressure-biased by the test fluid toward the interlocked configuration when the test fluid is greater than or equal to the threshold pressure.

Methods according to the present disclosure of pressure testing a device comprise clamping a device to be pressure-tested by applying a clamp pressure of a clamp fluid, delivering a test fluid at a test pressure to the device while the device is clamped by the clamp pressure to test the device for integrity, and preventing release of the clamp pressure on the device until the test fluid is below a threshold pressure that is less than the test pressure.

DESCRIPTION

Pressure testing systems with safety interlock and methods of pressure-testing a device are disclosed herein. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
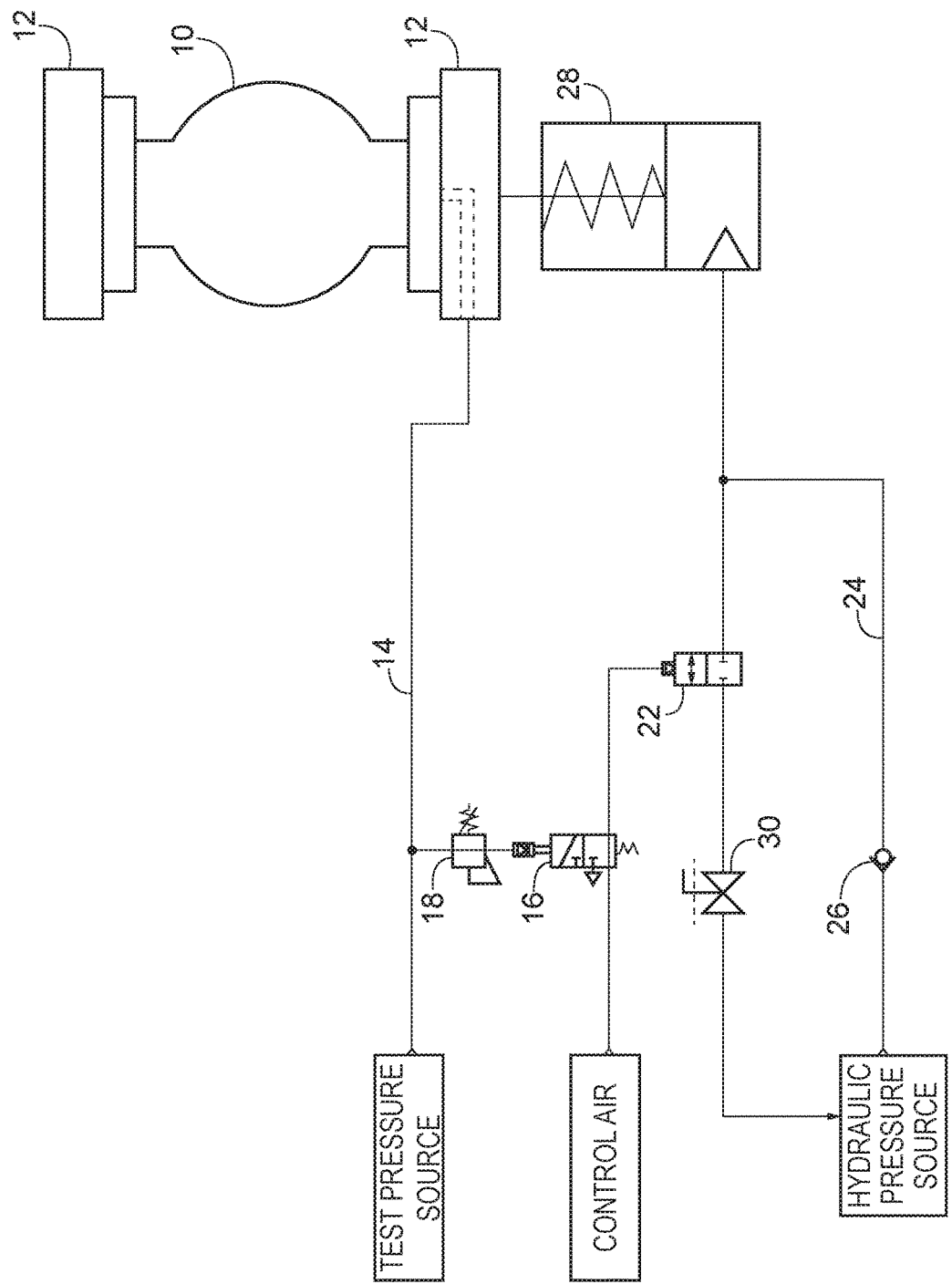
FIG. 1 is a schematic diagram of a prior art pressure testing system.
Figure 2:
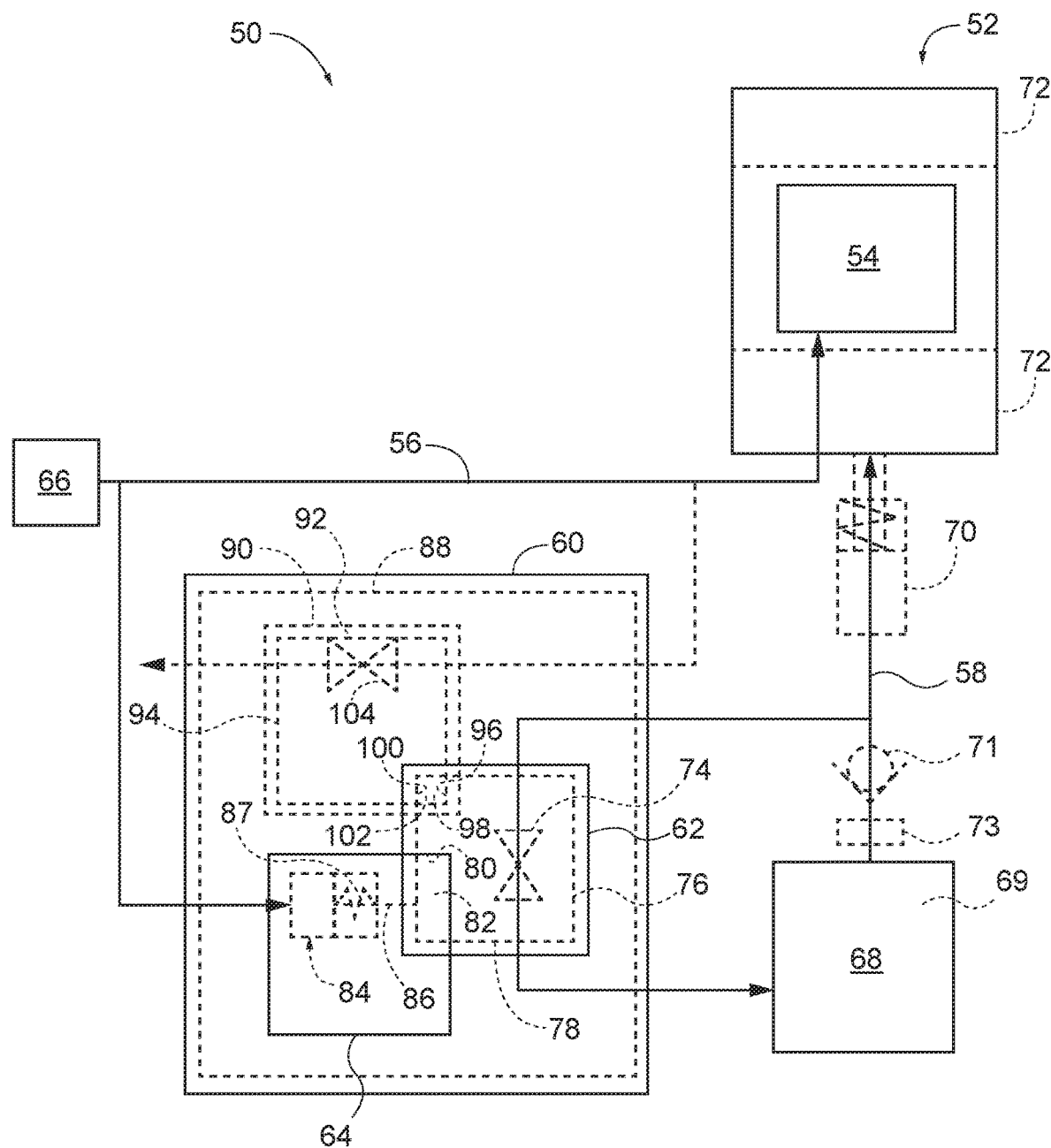
FIG. 2 is a schematic diagram representing example pressure testing systems with safety interlock according to the present disclosure.

As schematically represented in FIG. 2, pressure testing systems 50 with safety interlock generally comprise at least a clamp assembly 52 and a control assembly 60.

The clamp assembly 52 is configured to receive, clamp, and operatively seal a device 54 for delivery of a test fluid 56 at a test pressure to the device 54 to test the device 54 for integrity. Device 54, for example, may be a valve or other device that when in service experiences a high internal fluid pressure (e.g., from a pressurized gas or liquid). Accordingly, pressure testing systems 50 may be used to test a device 54 for leaks and the ability to withstand pressures within a certain range depending on the specific application of the device. As illustrative, non-exclusive examples, pressure testing systems 50 may be configured to deliver a test fluid at a test pressure up to 5,000 psi, up to 10,000 psi, up to 22,500 psi, or greater and/or in the ranges of 0-25,000, psi, 0-10,000 psi, 0-5,000 psi, 5,000-25,000 psi, 5,000-10,000, or 10,000-25,000 psi. Pressure testing systems 50 additionally or alternatively may be described as or referred to as valve testing systems; however, pressure testing systems 50 are not limited to being used exclusively for testing valves. Illustrative, non-exclusive examples of types of valves and devices 54 that may be tested with pressure testing systems 50 include (but are not limited to) relief valves, butterfly valves, check valves, ball valves, globe valves, gate valves, needle valves, spools, and manifolds, such as used in the oil and gas, shipbuilding and repair, and/or power generation industries.

Test fluid 56 may take various forms depending on the specific application of a device 54 to be tested by a pressure testing system 50. For example, in some examples, test fluid 56 may be a gas, such as air. In other examples, test fluid 56 may be a liquid. Some pressure testing systems 50 may include a source 66 of test fluid 56, such as a tank of compressed gas and/or a compressor in examples where the test fluid 56 is a gas, or such as a tank of hydraulic fluid and a hydraulic cylinder in examples where the test fluid 56 is a liquid. Alternatively, rather than including a source 66 of test fluid 56, some examples of pressure testing systems 50 instead may be configured to be operatively coupled to a source 66 of test fluid 56. For example, pressure testing systems 50 that are designed to be portable may be configured to be operatively coupled to a source 66 that is on-site of a device 54 to be tested, where such site has a source 66 of test fluid 56, such as a source of compressed air or test fluid 56 that is maintained at, or otherwise available to be delivered at, a test pressure. Other examples of source 66 of test fluid 56 are within the scope of the present disclosure and may be incorporated into pressure testing systems 50 and/or used with pressure testing systems 50.

With continued reference to FIG. 2, the clamp assembly 52 is configured to securely clamp the device 54 via application of a clamp pressure of a clamp fluid 58. In some examples, the clamp fluid 58 may be a gas, in which case the clamp assembly 52 may be described as a pneumatic clamp assembly. In other examples, the clamp fluid 58 may be a liquid, in which case the clamp assembly 52 may be described as a hydraulic clamp assembly. Some pressure testing systems 50 may include a source 68 of clamp fluid 58. For example, in combination with a source of hydraulic fluid, a pressure testing system 50 may further comprise a hydraulic cylinder 70 that is configured to utilize the clamp pressure of the clamp fluid 58 to securely clamp the device in the clamp assembly 52, as schematically and optionally represented in FIG. 2. In such examples, the source 68 of clamp fluid 58 may comprise a tank 69 of hydraulic fluid, a pump 73, and a check valve 71 in line with the hydraulic cylinder 70, such that the application of the clamp pressure to the clamp assembly 52 by the hydraulic cylinder 70 operatively clamps a device 54 in the clamp assembly 52, and release of the clamp pressure by the hydraulic cylinder 70 causes the hydraulic fluid to be routed back to the tank 69. Other examples of source 68 also are within the scope of the present disclosure. Moreover, some pressure testing systems 50 may include a source 68 of clamp fluid 58, whereas other examples of pressure testing systems 50 may instead be configured to be operatively coupled to a source 68 of clamp fluid 58, such as on-site where a device 54 is to be tested.

As schematically represented in FIG. 2, in some examples of pressure testing systems 50, the clamp assembly 52 comprises one or more seal plates 72 that are configured to seal against the device 54 to be tested. In some such examples, at least one of the seal plates 72 is configured to deliver the test fluid 56 to the device 54, as schematically represented in FIG. 2. Moreover, when a source 68 of clamp pressure includes a hydraulic cylinder 70, the hydraulic cylinder 70 may be configured to apply the clamp pressure to at least one seal plate 72, which results in the device 54 being operatively clamped by the clamp assembly 52 for delivery of the test fluid 56 to the device. Other configurations of clamp assemblies 50 also are within the scope of the present disclosure.

The control assembly 60 of pressure testing systems 50 is operatively coupled to the clamp assembly 52 and is configured to control application of the clamp pressure to the clamp assembly 52. As schematically represented in FIG. 2, the control assembly 60 comprises a clamp control structure 62 and a safety structure 64. The clamp control structure 62 is configured to be manually moved by a user between an activated configuration and an inactivated configuration. In the activated configuration, the clamp control structure 62 permits the clamp pressure of the clamp fluid 58 to be applied to the clamp assembly 52 to securely clamp the device 54. In the inactivated configuration, the clamp control structure 62 permits the clamp pressure of the clamp fluid 58 to be released from the clamp assembly 52 to release the device 54 from the clamp assembly 52. For example, in some pressure testing systems 50, the clamp control structure 62 comprises an on/off valve 74 (e.g., a ball valve), such that when the clamp control structure 62 is in the activated configuration, the on/off valve 74 prevents the clamp fluid 58 from flowing through the on/off valve 74, and when the clamp control structure 62 is in the inactivated configuration, the on/off valve 74 permits the clamp fluid 58 to flow through the on/off valve 74.

The safety structure 64 of the control assembly 60 is configured to be fluidly actuated by the test fluid 56 between an interlocked configuration and a disengaged configuration. In the interlocked configuration, the safety structure 64 physically prevents the clamp control structure 62 from being moved by the user from the activated configuration to the inactivated configuration. In the disengaged configuration, the safety structure 64 permits the clamp control structure 62 to be moved by the user from the activated configuration to the inactivated configuration.

More specifically, the safety structure 64 is spring-biased toward the disengaged configuration when the test fluid 56 is below a threshold pressure that is less than the test pressure, and the safety structure 64 is pressure-biased by the test fluid 56 toward the interlocked configuration when the test fluid 56 is greater than or equal to the threshold pressure. The threshold pressure is selected to be a safe pressure that, if still applied to the device 54, would not be dangerous if the clamp assembly 52 were to release the device 54. As illustrative, non-exclusive examples, the threshold pressure may be at least 25% less, at least 50% less, or at least 75% less than the test pressure and/or may be less than 50 psi, less than 30 psi, or less than 20 psi.

As schematically represented in FIG. 2, in some examples, the safety structure 64 comprises a pressure-actuated cylinder 84 with a piston rod 86 and a return spring 87. In such examples, when the safety structure 64 is in the interlocked configuration and when the clamp control structure 62 is in the activated configuration, the piston rod 86 engages the clamp control structure 62 and physically prevents the clamp control structure 62 from being moved to the inactivated configuration by the user. More specifically, when the test fluid 56 is at or above the threshold pressure, the pressure of the test fluid 56 causes the piston rod to move into engagement with the clamp control structure 62 against the bias of the return spring 87. Conversely, when the safety structure 64 is in the disengaged configuration, the piston rod 86 is retracted away from the clamp control structure 62 and permits the clamp control structure 62 to be moved between the activated configuration and the inactivated configuration by the user. More specifically, when the test fluid is below the threshold pressure, the return spring 87 causes the piston rod to move out of engagement with the clamp control structure 62, thereby permitting the clamp control structure 62 to be manually moved by the user.

In some examples of pressure testing systems 50, the clamp control structure 62 comprises a user engagement member 76 that is configured to be selectively engaged and moved by the user to reconfigure the clamp control structure 62 between the activated configuration and the inactivated configuration. For example, the user engagement member 76 may comprise or be a knob 78 that is configured to be selectively engaged and rotated by the user to reconfigure the clamp control structure 62 between the activated configuration and the inactivated configuration; however, other configurations of user engagement member 76 also are within the scope of the present disclosure, such as (but not limited to) buttons, sliders, and dials.

As schematically represented in FIG. 2, in some such pressure testing systems 50, the user engagement member 76 defines a recess 80 that is aligned with a portion 82 of the safety structure 64 when the clamp control structure 62 is in the activated configuration, and the portion 82 of the safety structure 64 is at least partially received within the recess 80 when the safety structure 64 is in the interlocked configuration and the clamp control structure 62 is in the activated configuration to physically prevent the user engagement member 76 from being moved away from the activated configuration by the user. Moreover, in examples where the clamp control structure 62 comprises an on/off valve 74, the user engagement member 76 is operatively coupled to the on/off valve 74, such that user manipulation of the user engagement member 76 will physically move the on/off valve 74 between an open position and a closed position and thus will reconfigure the clamp control structure 62 between the activated configuration and the inactivated configuration.

In some examples of pressure testing systems 50, the control assembly 60 further comprises a face plate 88 or other structure that operatively supports or otherwise positions components of the control assembly 60 for operation by a user. In some such examples, in which the safety structure 64 comprises a pressure-actuated cylinder 84 and in which the clamp control structure 62 comprises a user engagement member 76, the user engagement member 76 may be supported on one side of (e.g., above) the face plate 88, and the pressure-actuated cylinder 84 may be mounted on the opposite side of (e.g., below) the face plate 88. In some such examples, when the clamp control structure 62 is in the activated configuration and the safety structure 64 is in the interlocked configuration, the piston rod 86 extends through the face plate 88 and engages the user engagement member 76 to physically prevent the user engagement member 76 from being moved from the activated configuration to the inactivated configuration by the user. In examples in which the clamp control structure 62 comprises an on/off valve 74, the on/off valve 74 also may be positioned below the face plate 88, when present, for example, with the user engagement member 76 being operatively coupled to the on/off valve 74 through the face plate. Accordingly, the piston rod 86, or structure operatively coupled thereto, may provide a visual indication to a user of a pressure testing system 50 whether the safety structure 64 is in the interlocked configuration (engaged with and preventing movement of the user engagement member 76) or in the disengaged configuration (disengaged from and not preventing movement of the user engagement member 76).

Still referring to FIG. 2, in some pressure testing systems 50, the control assembly 60 is further configured to control application of the test pressure to the device 54. More specifically, the control assembly 60 may further comprise a test pressure control structure 90 that is configured to be manually moved by the user between a pressurized configuration and a depressurized configuration. In the pressurized configuration, the test pressure control structure 90 permits the test pressure of the test fluid 56 to be applied to the device 54 to test the device 54 for integrity. In the depressurized configuration, the test pressure control structure 90 permits the test pressure of the test fluid 56 to be released from the device 54. For example, in some pressure testing systems 50, the test pressure control structure 90 comprises an on/off valve 104 (e.g., a ball valve), such that when the test pressure control structure 90 is in the pressurized configuration, the on/off valve 104 prevents the test fluid 56 from flowing through the on/off valve 104, and when the test pressure control structure 90 is in the depressurized configuration, the on/off valve 104 permits the test fluid 56 to flow through the on/off valve 104.

In some examples, the test pressure control structure 90 may further comprise a user engagement member 92 that is configured to be selectively engaged and moved by the user to reconfigure the test pressure control structure 90 between the pressurized configuration and the depressurized configuration. For example, the user engagement structure 92 may be operatively coupled to the on/off valve 104, when present. As a more specific example, the user engagement member 92 may comprise or be a knob 94 that is configured to be selectively engaged and rotated by the user to reconfigure the test pressure control structure 90 between the pressurized configuration and the depressurized configuration (e.g., by reconfiguring the on/off valve 104 from an open position to a closed position); however, other configurations of the user engagement member 92 also are within the scope of the present disclosure, such as (but not limited to) buttons, sliders, and dials. In examples of control assemblies 60 that include a face plate 88, the user engagement member 92 may be supported on one side of (e.g., above) the face plate 88, and the on/off valve 104 may be positioned on the opposite side of (e.g., below) the face plate 88.

In some examples of test pressure control structure 90, the test pressure control structure 90 may be mechanically interlocked with the clamp control structure 62. For example, in examples where the clamp control structure 62 comprises a user engagement member 76 (e.g., a knob 78), when the test pressure control structure 90 is in the pressurized configuration, the user engagement member 92 of the test pressure control structure 90 may physically prevent the user engagement member 76 of the clamp control structure 62 from being moved by the user to reconfigure the clamp control structure 62 from the activated configuration to the inactivated configuration. As a more specific example, and as schematically represented in FIG. 2, the knob 78 may comprise a recess 96 that receives a portion 98 of the knob 94 when the clamp control structure 62 is in the activated configuration and the test pressure control structure 90 is in the pressurized configuration, with the portion 98 physically preventing rotation of the knob 78 by the user and thus physically preventing reconfiguring of the clamp control structure 62 from the activated configuration to the inactivated configuration.

Additionally or alternatively, when the clamp control structure 62 is in the inactivated configuration, the user engagement member 76 (e.g., a knob 78) may physically prevent the user engagement member 92 (e.g., a knob 94) from being moved by the user to reconfigure the test pressure control structure 90 from the depressurized configuration to the pressurized configuration. As a more specific example, and as schematically represented in FIG. 2, the knob 94 may comprise a recess 100 that receives a portion 102 of the knob 78 when the test pressure control structure 90 is in the depressurized configuration and the clamp control structure 62 is in the inactivated configuration, with the portion 102 of the knob 78 physically preventing rotation of the knob 94 by the user and thus physically preventing reconfiguring of the test pressure control structure 90 from the depressurized configuration to the pressurized configuration.

Turning now to FIGS. 3-6, an illustrative non-exclusive example of a control assembly 60 of a pressure testing system 50 is illustrated and indicated as control assembly 150. Where appropriate, the reference numerals from the schematic illustrations of FIG. 2 are used to designate corresponding parts of control assembly 150; however, the example control assembly 150 is non-exclusive and does not limit pressure testing systems 50 and control assemblies 60 to the illustrated embodiment of the control assembly 150. That is, pressure testing systems 50 and control assemblies 60 thereof are not limited to the specific embodiment of control assembly 150, and pressure testing systems 50 and control assemblies 60 thereof may incorporate any number of the various aspects, configurations, characteristics, properties, etc. of pressure testing systems 50 that are illustrated in and discussed with reference to the schematic representations of FIG. 2 and/or the embodiment of FIGS. 3-6, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the example of FIGS. 3-6; however, it is within the scope of the present disclosure that the previously discussed features, variants, etc. may be utilized with the example of FIGS. 3-6.

As seen in FIG. 3-6, control assembly 150 is an example of a control assembly 60 that includes a user engagement member 76 in the form of a knob 78 (designated as "CLAMP INTERLOCK") having a recess 80 and a recess 96, and a user engagement member 92 in the form of a knob 94 (designated as "TEST PRESSURE VENT") having a recess 100. The knob 78 and the knob 94 are both supported on the same side of (e.g., above) a face plate 88 for access, engagement, and manipulation by a user. Control assembly 150 also includes a safety structure 64 (designated as "TEST PRESSURE INDICATOR") having a portion 82 corresponding to a piston rod 86 of a pressure-actuated cylinder that is supported below the face plate 88 with the portion 82 operative to extend through the face plate 88.

Figure 3:
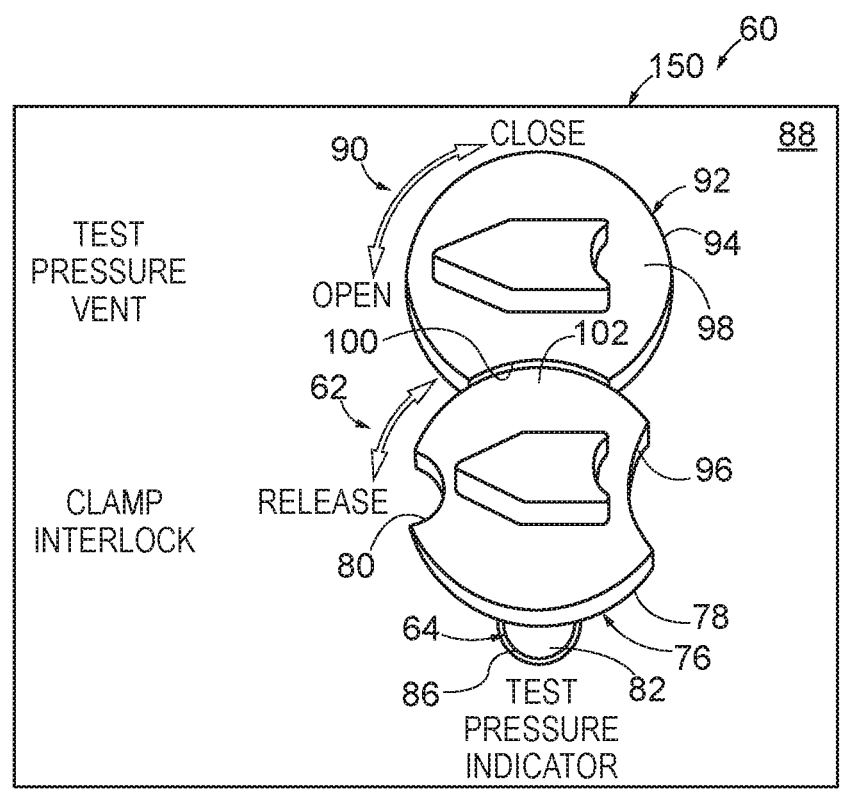
FIG. 3 is a top perspective view of an illustrative, non-exclusive example of a control assembly of a pressure testing system with safety interlock according to the present disclosure, with the clamp control structure in the inactivated configuration, the safety structure in the disengaged configuration, and the test pressure control structure in the depressurized configuration.

In FIG. 3, the clamp control structure 62 is in its inactivated configuration, as designated by the knob 78 pointing toward an indication of "RELEASE," the test pressure control structure 90 is in its depressurized configuration, as designated by the knob 94 pointing toward an indication of "OPEN," and the safety structure 64 is in its disengaged configuration as visually detected by the portion 82 thereof being flush with the face plate 88, below the knob 78, and not engaged with the recess 80 of the knob 78. Portion 102 of the knob 78 is received in recess 100 of the knob 94, and thus the knob 78 prevents the knob 94 from being rotated by a user. Accordingly, FIG. 3 represents a condition of a test pressure system 50 in which a device 54 to be tested may be safely positioned within or removed from the clamp assembly 52.

Figure 4:
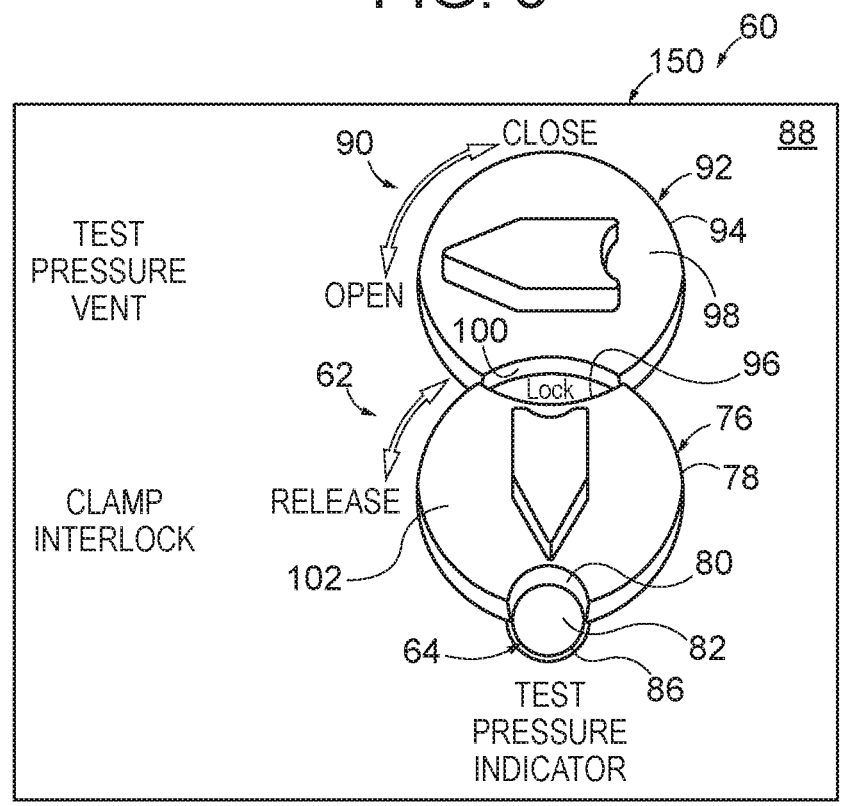
FIG. 4 is another top perspective view of the control assembly of FIG. 3, with the clamp control structure in the activated configuration, the safety structure in the disengaged configuration, and the test pressure control structure in the depressurized configuration.

In FIG. 4, the clamp control structure 62 is in its activated configuration, with the knob 78 having been rotated 90° from its position in FIG. 3 and aligned with an indication of "LOCK." Accordingly, FIG. 4 represents a condition of a test pressure system 50 in which a device 54 is operatively clamped by the clamp assembly 52 but the test fluid 56 has yet to be pressurized and delivered to the device 54, or in which a device is operatively clamped by the clamp assembly 52 and the test fluid 56 has fallen below the threshold pressure. When in this condition, a user may operatively rotate the knob 78 or the knob 94, but not both.

Figure 5:
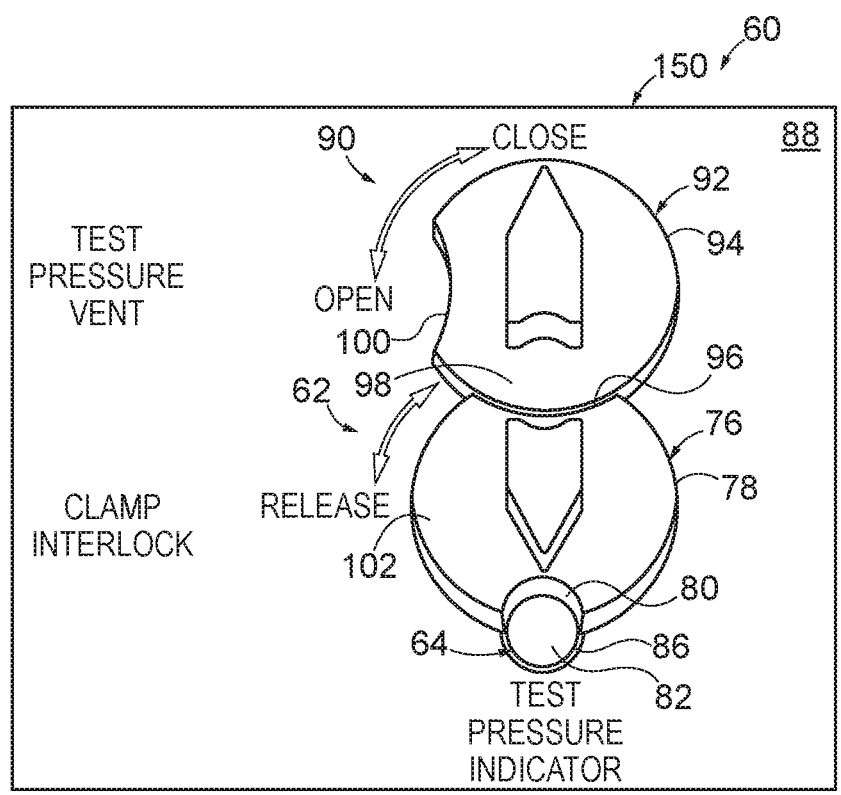
FIG. 5 is another top perspective view of the control assembly of FIG. 3, with the clamp control structure in the activated configuration, the safety structure in the disengaged configuration, and the test pressure control structure in the pressurized configuration.

In FIG. 5, the test pressure control structure 90 is in its pressurized configuration, with the knob 94 having been rotated 90° from its position in FIGS. 3 and 4 and pointing toward an indication of "CLOSE." The safety structure 64 is still in its disengaged configuration as visually detected by the portion 82 thereof being flush with the face plate and not yet engaged with the recess 80 of the knob 78. Portion 98 of the knob 94 is received in recess 96 of the knob 78, and thus the knob 94 prevents the knob 78 from being rotated by a user. Accordingly, FIG. 5 represents a condition of a test pressure system 50 in which the test fluid 56 is beginning to pressurize a device 54 but has yet to reach the threshold pressure to cause the safety structure 64 to reconfigure to its interlocked configuration.

Figure 6:
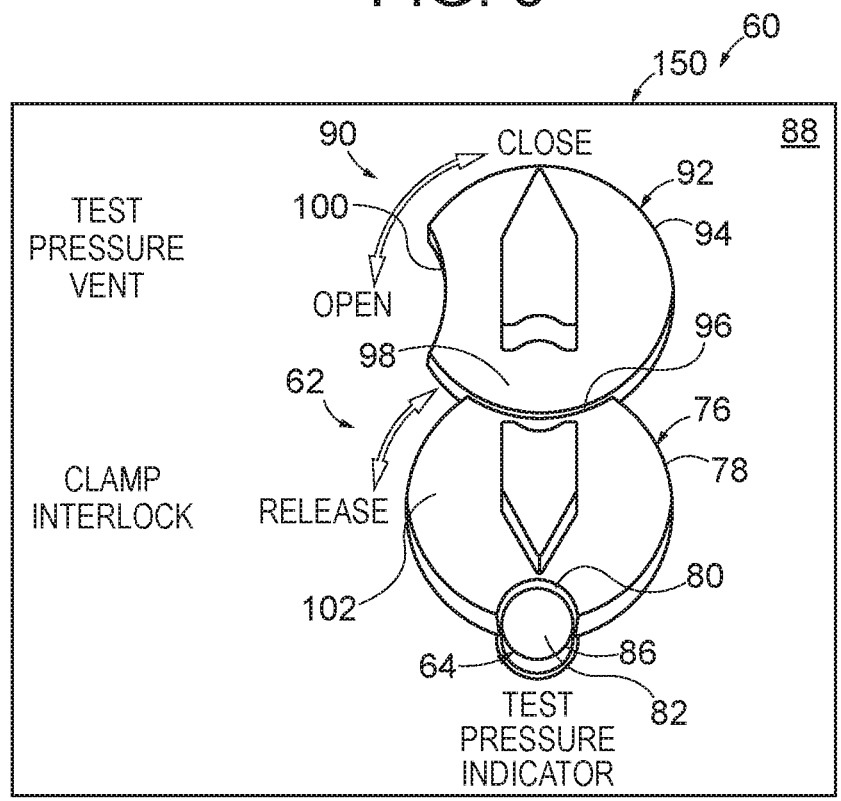
FIG. 6 is another top perspective view of the control assembly of FIG. 3, with the clamp control structure in the activated configuration, the safety structure in the interlocked configuration, and the test pressure control structure in the pressurized configuration.

In FIG. 6, the safety structure 64 is in its interlocked configuration as visually detected by the portion 82 thereof being above the face plate 88 and engaged with the recess 80 of the knob 78. Accordingly, FIG. 6 represents a condition of a test pressure system 50 in which a device 54 is operatively clamped by the clamp assembly 52 and the test fluid 56 is greater than or equal to the threshold pressure, and thus with the device being pressurized toward or pressurized at the test pressure.

To conclude an integrity test of a device 54 and be permitted to safely remove the device 54 from the clamp assembly 52, a user would follow the sequence of FIG. 6 to FIG. 4 to FIG. 3.

Figure 7:
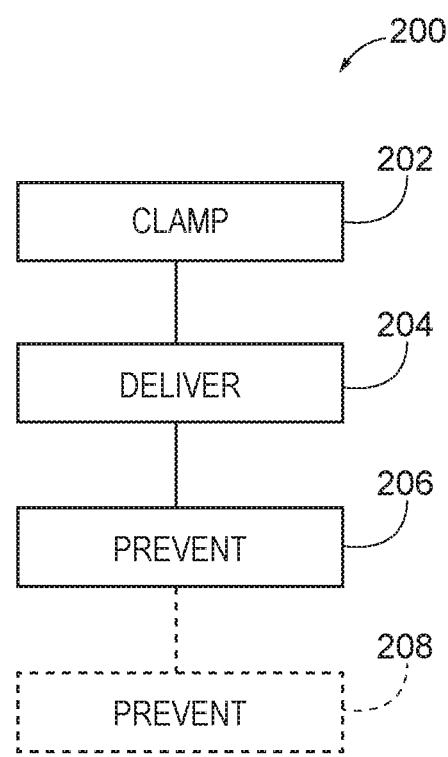
FIG. 7 is a flow chart schematically representing methods according to the present disclosure of pressure testing a device.

FIG. 7 schematically provides a flowchart that represents illustrative, non-exclusive examples of methods 200 of pressure testing a device according to the present disclosure. In FIG. 7, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 7 are not limiting and other methods and steps are within the scope of the present disclosure, including methods having greater than or fewer than the number of steps illustrated, as understood from the discussions herein. Moreover, methods 200 may (but are not required to) be implemented, performed, and/or facilitated by a pressure testing system 50 according to the present disclosure, and similarly, pressure testing systems 50 may (but are not required to) be configured to implement, perform, and/or facilitate a method 200 according to the present disclosure.

As schematically represented in FIG. 7, methods 200 comprise clamping 202 a device (e.g., device 54) to be pressure-tested by applying a clamp pressure of a clamp fluid (e.g, clamp fluid 58), delivering 204 a test fluid (e.g., test fluid 56) at a test pressure to the device while the device is clamped by the clamp pressure to test the device for integrity, and preventing 206 release of the clamp pressure on the device until the test fluid is below a threshold pressure that is less than the test pressure.

In some methods 200, the threshold pressure is at least 25% less, at least 50% less, or at least 75% less than the test pressure. In some methods 200, the threshold pressure is less than 50 psi, less than 30 psi, or less than 20 psi. In some methods 200, the test fluid is a gas, while in other methods 200, the test fluid is a liquid. Similarly, in some methods 200, the clamp fluid is a gas, while in other methods 200, the clamp fluid is a liquid.

In some methods 200, the clamping 202 is controlled by a clamp control structure (e.g., clamp control structure 62) that is configured to be manually moved by a user between an activated configuration and an inactivated configuration. In the activated configuration, the clamp control structure permits the clamp pressure of the clamp fluid to be applied to securely clamp the device, and in the inactivated configuration, the clamp control structure permits the clamp pressure of the clamp fluid to be released to release the device. Additionally, in such methods 200, the preventing 206 is controlled by a safety structure (e.g., safety structure 64) that is fluidly actuated by the test fluid between an interlocked configuration and a disengaged configuration. In the interlocked configuration, the safety structure physically prevents the clamp control structure from being moved by the user from the activated configuration to the inactivated configuration, and in the disengaged configuration, the safety structure permits the clamp control structure to be moved by the user from the activated configuration to the inactivated configuration. Moreover, in such methods 200, the safety structure is spring-biased toward the disengaged configuration when the test fluid is below a threshold pressure that is less than the test pressure, and the safety structure is pressure-biased by the test fluid toward the interlocked configuration when the test fluid is greater than or equal to the threshold pressure.

In some such methods 200, the delivering 204 is controlled by a test pressure control structure (e.g., test pressure control structure 90) that is configured to be manually moved by the user between a pressurized configuration and a depressurized configuration. In the pressurized configuration, the test pressure control structure permits the test pressure of the test fluid to be applied to the device to test the device for integrity, and in the depressurized configuration, the test pressure control structure permits the test pressure of the test fluid to be released from the device. Additionally, in such methods 200, the preventing 206 is further controlled by the test pressure control structure by physically preventing the clamp control structure from being reconfigured from the activated configuration to the inactivated configuration while the test pressure control structure is in the pressurized configuration.

In some such examples, the method 200 may further comprise preventing 208 the delivering 204, with the preventing 208 being controlled by the clamp control structure by physically preventing the test pressure control structure from being reconfigured from the depressurized configuration to the pressurized configuration while the clamp control structure is in the inactivated configuration.

Illustrative, non-exclusive examples of inventive subject matter according to the present disclosure are described in the following enumerated paragraphs:

A. A pressure testing system, comprising:

a clamp assembly configured to receive, clamp, and operatively seal a device for delivery of a test fluid at a test pressure to the device to test the device for integrity, wherein the clamp assembly is configured to securely clamp the device via application of a clamp pressure of a clamp fluid; and a control assembly operatively coupled to the clamp assembly, wherein the control assembly is configured to control application of the clamp pressure to the clamp assembly, wherein the control assembly comprises:

a clamp control structure configured to be manually moved by a user between an activated configuration and an inactivated configuration, wherein in the activated configuration, the clamp control structure permits the clamp pressure of the clamp fluid to be applied to the clamp assembly to securely clamp the device, and wherein in the inactivated configuration, the clamp control structure permits the clamp pressure of the clamp fluid to be released from the clamp assembly to release the device from the clamp assembly; and a safety structure configured to be fluidly actuated by the test fluid between an interlocked configuration and a disengaged configuration, wherein in the interlocked configuration, the safety structure physically prevents the clamp control structure from being moved by the user from the activated configuration to the inactivated configuration, wherein in the disengaged configuration, the safety structure permits the clamp control structure to be moved by the user from the activated configuration to the inactivated configuration, wherein the safety structure is spring-biased toward the disengaged configuration when the test fluid is below a threshold pressure that is less than the test pressure, and wherein the safety structure is pressure-biased by the test fluid toward the interlocked configuration when the test fluid is greater than or equal to the threshold pressure.

A1. The pressure testing system of paragraph A, wherein the threshold pressure is at least 25% less, at least 50% less, or at least 75% less than the test pressure.

A2. The pressure testing system of any of paragraphs A-A1, wherein the threshold pressure is less than 50 psi, less than 30 psi, or less than 20 psi.

A3. The pressure testing system of any of paragraphs A-A2, further comprising a source of the test fluid.

A4. The pressure testing system of any of paragraphs A-A3, wherein the test fluid is a gas.

A5. The pressure testing system of any of paragraphs A-A3, wherein the test fluid is a liquid.

A6. The pressure testing system of any of paragraphs A-A5, further comprising a source of the clamp fluid.

A7. The pressure testing system of any of paragraphs A-A6, wherein the clamp fluid is a gas.

A8. The pressure testing system of any of paragraphs A-A6, wherein the clamp fluid is a liquid.

A8.1. The pressure testing system of paragraph A8, wherein the clamp assembly comprises a hydraulic cylinder configured to utilize the clamp pressure of the clamp fluid to securely clamp the device.

A9. The pressure testing system of any of paragraphs A-A8.1, wherein the clamp assembly comprises one or more seal plates configured to seal against the device, and wherein at least one of the seal plates is configured to deliver the test fluid to the device.

A10. The pressure testing system of any of paragraphs A-A9, wherein the clamp control structure comprises a (first) on/off valve, wherein when the clamp control structure is in the activated configuration, the (first) on/off valve prevents the clamp fluid from flowing through the (first) on/off valve, and wherein when the clamp control structure is in the inactivated configuration, the (first) on/off valve permits the clamp fluid to flow through the (first) on/off valve.

A11. The pressure testing system of any of paragraphs A-A10, wherein the clamp control structure comprises a (first) user engagement member configured to be selectively engaged and moved by the user to reconfigure the clamp control structure between the activated configuration and the inactivated configuration.

A11.1. The pressure testing system of paragraph A11, wherein the (first) user engagement member comprises a (first) knob configured to be selectively engaged and rotated by the user to reconfigure the clamp control structure between the activated configuration and the inactivated configuration.

A11.2. The pressure testing system of any of paragraphs A11-A11.1, wherein the (first) user engagement member defines a (first) recess that is aligned with a portion of the safety structure when the clamp control structure is in the activated configuration, and wherein the portion of the safety structure is at least partially received within the (first) recess when the safety structure is in the interlocked configuration and the clamp control structure is in the activated configuration to physically prevent the (first) user engagement member from being moved away from the activated configuration by the user.

A11.3. The pressure testing system of any of paragraphs A11-A11.2, when depending from paragraph A10, wherein the (first) user engagement member is operatively coupled to the (first) on/off valve.

A12. The pressure testing system of any of paragraphs A-A11.3, wherein the safety structure comprises a pressure-actuated cylinder with a piston rod, wherein when the safety structure is in the interlocked configuration and when the clamp control structure is in the activated configuration, the piston rod engages the clamp control structure and physically prevents the clamp control structure from being moved to the inactivated configuration by the user, and wherein when the safety structure is in the disengaged configuration, the piston rod is retracted away from the clamp control structure and permits the clamp control structure to be moved between the activated configuration and the inactivated configuration by the user.

A12.1. The pressure testing system of paragraph A12, wherein the control assembly further comprises a face plate, wherein the clamp control structure comprises a/the (first) user engagement member supported on one side of the face plate and configured to be selectively engaged and moved by the user to reconfigure the clamp control structure between the activated configuration and the inactivated configuration, wherein the pressure-actuated cylinder is supported on an opposite side of the face plate, and wherein when the clamp control structure is in the activated configuration and the safety structure is in the interlocked configuration, the piston rod extends through the face plate and engages the (first) user engagement member to prevent the (first) user engagement member from being moved from the activated configuration to the inactivated configuration by the user.

A12.1.1. The pressure testing system of paragraph A12.1, when depending from paragraph A10, wherein the (first) on/off valve is positioned below the face plate, and wherein the (first) user engagement member is operatively coupled to the (first) on/off valve.

A13. The pressure testing system of any of paragraphs A-A12.1.1, wherein the control assembly is further configured to control application of the test pressure to the device.

A13.1. The pressure testing system of paragraph A13, wherein the control assembly further comprises a test pressure control structure configured to be manually moved by the user between a pressurized configuration and a depressurized configuration, wherein in the pressurized configuration, the test pressure control structure permits the test pressure of the test fluid to be applied to the device to test the device for integrity, and wherein in the depressurized configuration, the test pressure control structure permits the test pressure of the test fluid to be released from the device.

A13.1.1. The pressure testing system of paragraph A13.1, wherein the test pressure control structure comprises a (second) user engagement member configured to be selectively engaged and moved by the user to reconfigure the test pressure control structure between the pressurized configuration and the depressurized configuration.

A13.1.1.1. The pressure testing system of paragraph A13.1.1, wherein the (second) user engagement member comprises a (second) knob configured to be selectively engaged and rotated by the user to reconfigure the test pressure control structure between the pressurized configuration and the depressurized configuration.

A13.1.1.2. The pressure testing system of any of paragraphs A13.1.1-A13.1.1.1, when depending from paragraph A11, wherein when the test pressure control structure is in the pressurized configuration, the (second) user engagement member physically prevents the (first) user engagement member from being moved by the user to reconfigure the clamp control structure from the activated configuration to the inactivated configuration.

A13.1.1.2.1. The pressure testing system of paragraph A13.1.1.2, when depending from paragraph A11.1., wherein the (first) knob comprises a (second) recess that receives a portion of the (second) knob when the clamp control structure is in the activated configuration and the test pressure control structure is in the pressurized configuration, and wherein the portion of the (second) knob physically prevents rotation of the (first) knob by the user and thus physically prevents reconfiguring the clamp control structure from the activated configuration to the inactivated configuration.

A13.1.1.3. The pressure testing system of any of paragraphs A13.1.1-13.1.1.2.1, when depending from paragraph A11, wherein when the clamp control structure is in the inactivated configuration, the (first) user engagement member physically prevents the (second) user engagement member from being moved by the user to reconfigure the test pressure control structure from the depressurized configuration to the pressurized configuration.

A13.1.1.3.1. The pressure testing system of paragraph A13.1.1.3, when depending from paragraph A13.1.1.1 and A11.1, wherein the (second) knob comprises a (third) recess that receives a portion of the (first) knob when the test pressure control structure is in the depressurized configuration and the clamp control structure is in the inactivated configuration, and wherein the portion of the (first) knob physically prevents rotation of the (second) knob by the user and thus physically prevents reconfiguring the test pressure control structure from the depressurized configuration to the pressurized configuration.

A13.1.2. The pressure testing system of any of paragraphs A13.1-A13.1.1.3.1, wherein the test pressure control structure comprises a (second) on/off valve, wherein when the test pressure control structure is in the pressurized configuration, the (second) on/off valve prevents the test fluid from flowing through the (second) on/off valve, and wherein when the test pressure control structure is in the depressurized configuration, the (second) on/off valve permits the test fluid to flow through the (second) on/off valve.

A13.1.2.1. The pressure testing system of paragraph A13.1.2, when depending from paragraph A13.1.1, wherein the (second) user engagement member is operatively coupled to the (second) on/off valve.

A13.1.2.1.1. The pressure testing system of paragraph A13.1.2.1, wherein the control assembly further comprises a/the face plate, wherein the (second) user engagement member is supported on (the) one side of the face plate, and wherein the (second) on/off valve is positioned on an/the opposite side the face plate.

A14. The pressure testing system of any of paragraphs A-A13.1.2.1.1, configured to implement, perform, or facilitate the method of any of paragraphs B-B8.

B. A method of pressure testing a device, the method comprising:

clamping a device to be pressure-tested by applying a clamp pressure of a clamp fluid;

delivering a test fluid at a test pressure to the device while the device is clamped by the clamp pressure to test the device for integrity; and preventing release of the clamp pressure on the device until the test fluid is below a threshold pressure that is less than the test pressure.

B1. The method of paragraph B, wherein the threshold pressure is at least 25% less, at least 50% less, or at least 75% less than the test pressure.

B2. The method of any of paragraphs B-B1, wherein the threshold pressure is less than 50 psi, less than 30 psi, or less than 20 psi.

B3. The method of any of paragraphs B-B2, wherein the test fluid is a gas.

B4. The method of any of paragraphs B-B2, wherein the test fluid is a liquid.

B5. The method of any of paragraphs B-B4, wherein the clamp fluid is a gas.

B6. The method of any of paragraphs B-B4, wherein the clamp fluid is a liquid.

B7. The method of any of paragraphs B-B6, wherein the clamping is controlled by a clamp control structure that is configured to be manually moved by a user between an activated configuration and an inactivated configuration, wherein in the activated configuration, the clamp control structure permits the clamp pressure of the clamp fluid to be applied to securely clamp the device, and wherein in the inactivated configuration, the clamp control structure permits the clamp pressure of the clamp fluid to be released to release the device; and wherein the preventing release of the clamp pressure is controlled by a safety structure that is fluidly actuated by the test fluid between an interlocked configuration and a disengaged configuration, wherein in the interlocked position, the safety structure physically prevents the clamp control structure from being moved by the user from the activated configuration to the inactivated configuration, wherein in the disengaged configuration, the safety structure permits the clamp control structure to be moved by the user from the activated configuration to the inactivated configuration, wherein the safety structure is spring-biased toward the disengaged configuration when the test fluid is below a threshold pressure that is less than the test pressure, and wherein the safety structure is pressure-biased by the test fluid toward the interlocked configuration when the test fluid is greater than or equal to the threshold pressure.

B7.1. The method of paragraph B7, wherein the delivering is controlled by a test pressure control structure that is configured to be manually moved by the user between a pressurized configuration and a depressurized configuration, wherein in the pressurized configuration, the test pressure control structure permits the test pressure of the test fluid to be applied to the device to test the device for integrity, and wherein in the depressurized configuration, the test pressure control structure permits the test pressure of the test fluid to be released from the device; and wherein the preventing release of the clamp pressure is further controlled by the test pressure control structure by physically preventing the clamp control structure from being reconfigured from the activated configuration to the inactivated configuration while the test pressure control structure is in the pressurized configuration.

B7.1.1. The method of paragraph B7.1, further comprising:

preventing the delivering, wherein the preventing the delivering is controlled by the clamp control structure by physically preventing the test pressure control structure from being reconfigured from the depressurized configuration to the pressurized configuration while the clamp control structure is in the inactivated configuration.

B8. The method of any of paragraphs B-B7.1.1, implemented, performed, or facilitated by the pressure testing system of any of paragraphs A-A13.1.2.1.1.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It also is within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A pressure testing system, comprising:
   a clamp assembly configured to receive, clamp, and operatively seal a device for delivery of a test fluid at a test pressure to the device to test the device for integrity, wherein the clamp assembly is configured to securely clamp the device via application of a clamp pressure of a clamp fluid; and
   a control assembly operatively coupled to the clamp assembly, wherein the control assembly is configured to control application of the clamp pressure to the clamp assembly, wherein the control assembly comprises:
      a clamp control structure configured to be manually moved by a user between an activated configuration and an inactivated configuration, wherein in the activated configuration, the clamp control structure permits the clamp pressure of the clamp fluid to be applied to the clamp assembly to securely clamp the device, and wherein in the inactivated configuration, the clamp control structure permits the clamp pressure of the clamp fluid to be released from the clamp assembly to release the device from the clamp assembly; and
      a safety structure configured to be fluidly actuated by the test fluid between an interlocked configuration and a disengaged configuration, wherein in the interlocked configuration, the safety structure physically prevents the clamp control structure from being moved by the user from the activated configuration to the inactivated configuration, wherein in the disengaged configuration, the safety structure permits the clamp control structure to be moved by the user from the activated configuration to the inactivated configuration, wherein the safety structure is spring-biased toward the disengaged configuration when the test fluid is below a threshold pressure that is less than the test pressure, and wherein the safety structure is pressure-biased by the test fluid toward the interlocked configuration when the test fluid is greater than or equal to the threshold pressure.

2. The pressure testing system of claim 1, wherein the test fluid is a gas, and wherein the clamp fluid is a liquid.

3. The pressure testing system of claim 1, wherein the clamp control structure comprises an on/off valve, wherein when the clamp control structure is in the activated configuration, the on/off valve prevents the clamp fluid from flowing through the on/off valve, and wherein when the clamp control structure is in the inactivated configuration, the on/off valve permits the clamp fluid to flow through the on/off valve.

4. The pressure testing system of claim 3,
   wherein the clamp control structure further comprises a user engagement member operatively coupled to the on/off valve and configured to be selectively engaged and moved by the user to reconfigure the clamp control structure between the activated configuration and the inactivated configuration; and
   wherein the user engagement member defines a recess that is aligned with a portion of the safety structure when the clamp control structure is in the activated configuration, and wherein the portion of the safety structure is at least partially received within the recess when the safety structure is in the interlocked configuration and the clamp control structure is in the activated configuration to physically prevent the user engagement member from being moved away from the activated configuration by the user.

5. The pressure testing system of claim 1, wherein the safety structure comprises a pressure-actuated cylinder with a piston rod, wherein when the safety structure is in the interlocked configuration and when the clamp control structure is in the activated configuration, the piston rod engages the clamp control structure and physically prevents the clamp control structure from being moved to the inactivated configuration by the user, and wherein when the safety structure is in the disengaged configuration, the piston rod is retracted away from the clamp control structure and permits the clamp control structure to be moved between the activated configuration and the inactivated configuration by the user.

6. The pressure testing system of claim 5, wherein the control assembly further comprises a face plate, wherein the clamp control structure comprises a user engagement member supported on one side of the face plate and configured to be selectively engaged and moved by the user to reconfigure the clamp control structure between the activated configuration and the inactivated configuration, wherein the pressure-actuated cylinder is supported on an opposite side of the face plate, and wherein when the clamp control structure is in the activated configuration and the safety structure is in the interlocked configuration, the piston rod extends through the face plate and engages the user engagement member to prevent the user engagement member from being moved from the activated configuration to the inactivated configuration by the user.

7. The pressure testing system of claim 1,
wherein the control assembly is further configured to control application of the test pressure to the device; and
wherein the control assembly further comprises a test pressure control structure configured to be manually moved by the user between a pressurized configuration and a depressurized configuration, wherein in the pressurized configuration, the test pressure control structure permits the test pressure of the test fluid to be applied to the device to test the device for integrity, and wherein in the depressurized configuration, the test pressure control structure permits the test pressure of the test fluid to be released from the device.

8. The pressure testing system of claim 7,
wherein the clamp control structure comprises a first user engagement member configured to be selectively engaged and moved by the user to reconfigure the clamp control structure between the activated configuration and the inactivated configuration;
wherein the test pressure control structure comprises a second user engagement member configured to be selectively engaged and moved by the user to reconfigure the test pressure control structure between the pressurized configuration and the depressurized configuration;
wherein when the test pressure control structure is in the pressurized configuration, the second user engagement member physically prevents the first user engagement member from being moved by the user to reconfigure the clamp control structure from the activated configuration to the inactivated configuration; and
wherein when the clamp control structure is in the inactivated configuration, the first user engagement member physically prevents the second user engagement member from being moved by the user to reconfigure the test pressure control structure from the depressurized configuration to the pressurized configuration.

9. The pressure testing system of claim 8,
wherein the first user engagement member defines a first recess that is aligned with a portion of the safety structure when the clamp control structure is in the activated configuration, and wherein the portion of the safety structure is at least partially received within the first recess when the safety structure is in the interlocked configuration and the clamp control structure is in the activated configuration to physically prevent the first user engagement member from being moved away from the activated configuration by the user;
wherein the first user engagement member comprises a first knob configured to be selectively engaged and rotated by the user to reconfigure the clamp control structure between the activated configuration and the inactivated configuration;
wherein the second user engagement member comprises a second knob configured to be selectively engaged and rotated by the user to reconfigure the test pressure control structure between the pressurized configuration and the depressurized configuration;
wherein the first knob comprises a second recess that receives a portion of the second knob when the clamp control structure is in the activated configuration and the test pressure control structure is in the pressurized configuration, and wherein the portion of the second knob physically prevents rotation of the first knob by the user and thus physically prevents reconfiguring the clamp control structure from the activated configuration to the inactivated configuration; and
wherein the second knob comprises a third recess that receives a portion of the first knob when the test pressure control structure is in the depressurized configuration and the clamp control structure is in the inactivated configuration, and wherein the portion of the first knob physically prevents rotation of the second knob by the user and thus physically prevents reconfiguring the test pressure control structure from the depressurized configuration to the pressurized configuration.

10. The pressure testing system of claim 7, wherein the test pressure control structure comprises an on/off valve, wherein when the test pressure control structure is in the pressurized configuration, the on/off valve prevents the test fluid from flowing through the on/off valve, and wherein when the test pressure control structure is in the depressurized configuration, the on/off valve permits the test fluid to flow through the on/off valve.

11. The pressure testing system of claim 10,
wherein the test pressure control structure comprises a user engagement member operatively coupled to the on/off valve and configured to be selectively engaged and moved by the user to reconfigure the test pressure control structure between the pressurized configuration and the depressurized configuration; and
wherein the control assembly further comprises a face plate, wherein the user engagement member is supported on one side of the face plate, and wherein the on/off valve is positioned on an opposite side of the face plate.

12. A pressure testing system, comprising:
a clamp assembly configured to receive, clamp, and operatively seal a device for delivery of a test fluid at a test pressure to the device to test the device for integrity, wherein the test fluid is a gas, wherein the clamp assembly is configured to securely clamp the device via application of a clamp pressure of a clamp fluid, and wherein the clamp fluid is a liquid; and
a control assembly operatively coupled to the clamp assembly, wherein the control assembly is configured to control application of the clamp pressure to the clamp assembly and to control application of the test pressure to the device, wherein the control assembly comprises:
a clamp control structure configured to be manually moved by a user between an activated configuration and an inactivated configuration, wherein the clamp control structure comprises a first on/off valve and a first user engagement member operatively coupled to the first on/off valve and configured to be selectively engaged and moved by the user to reconfigure the clamp control structure between the activated configuration and the inactivated configuration, wherein in the activated configuration, the first on/off valve is closed and permits the clamp pressure of the clamp fluid to be applied to the clamp assembly to securely clamp the device, and wherein in the inactivated configuration, the first on/off valve is open and permits the clamp pressure of the clamp fluid to be released from the clamp assembly to release the device from the clamp assembly;
a safety structure configured to be fluidly actuated by the test fluid between an interlocked configuration and a disengaged configuration, wherein in the interlocked configuration, the safety structure physically prevents the clamp control structure from being moved by the user from the activated configuration to the inactivated configuration, wherein in the disengaged configuration, the safety structure permits the clamp control structure to be moved by the user from the activated configuration to the inactivated configuration, wherein the safety structure is spring-biased toward the disengaged configuration when the test fluid is below a threshold pressure that is less than the test pressure, wherein the safety structure is pressure-biased by the test fluid toward the interlocked configuration when the test fluid is greater than or equal to the threshold pressure, wherein the safety structure comprises a pressure-actuated cylinder with a piston rod, wherein when the safety structure is in the interlocked configuration and when the clamp control structure is in the activated configuration, the piston rod engages the clamp control structure and physically prevents the clamp control structure from being moved to the inactivated configuration by the user, and wherein when the safety structure is in the disengaged configuration, the piston rod is retracted away from the clamp control structure and permits the clamp control structure to be moved between the activated configuration and the inactivated configuration by the user; and a test pressure control structure configured to be manually moved by the user between a pressurized configuration and a depressurized configuration, wherein the test pressure control structure comprises a second on/off valve and a second user engagement member operatively coupled to the second on/off valve and configured to be selectively engaged and moved by the user to reconfigure the test pressure control structure between the pressurized configuration and the depressurized configuration, wherein in the pressurized configuration, the second on/off valve is closed and permits the test pressure of the test fluid to be applied to the device to test the device for integrity, and wherein in the depressurized configuration, the second on/off valve is open and permits the test pressure of the test fluid to be released from the device;

wherein when the test pressure control structure is in the pressurized configuration, the second user engagement member physically prevents the first user engagement member from being moved by the user to reconfigure the clamp control structure from the activated configuration to the inactivated configuration; and wherein when the clamp control structure is in the inactivated configuration, the first user engagement member physically prevents the second user engagement member from being moved by the user to reconfigure the test pressure control structure from the depressurized configuration to the pressurized configuration.

13. A pressure testing system, comprising:
a clamp assembly configured to receive, clamp, and operatively seal a device for delivery of a test fluid at a test pressure to the device to test the device for integrity, wherein the clamp assembly is configured to securely clamp the device via application of a clamp pressure of a clamp fluid; and
a control assembly operatively coupled to the clamp assembly and comprising:
means for controlling application of the clamp pressure to the clamp assembly and release of the clamp pressure from the clamp assembly; and
means for preventing release of the clamp pressure from the clamp assembly when the test fluid is greater than or equal to a threshold pressure that is less than the test pressure.

14. The pressure testing system of claim 13, wherein the control assembly further comprises means for controlling application of the test pressure to the device and release of the test pressure from the device.

15. The pressure testing system of claim 14, wherein the control assembly further comprises means for preventing the application of the test pressure to the device until the device is clamped by the clamp assembly.

16. The pressure testing system of claim 15, wherein the control assembly further comprises means for preventing the release of the clamp pressure on the device until the test fluid is below the threshold pressure.

17. The pressure testing system of claim 14, wherein the control assembly further comprises means for preventing the release of the clamp pressure on the device until the test fluid is below the threshold pressure.

* * * * *